United States Patent [19]

Kim

[11] Patent Number: 4,794,666
[45] Date of Patent: Jan. 3, 1989

[54] HANDLE ASSEMBLY FOR A COOKING CONTAINER

[76] Inventor: Myeong S. Kim, 247 Abgujeong-dong, Kangnam-ku, Hyundae Apt., 112-Block No. 603, Seoul, Rep. of Korea

[21] Appl. No.: 93,169

[22] Filed: Sep. 2, 1987

Related U.S. Application Data

[63] Continuation of Ser. No. 770,199, Aug. 28, 1985, abandoned.

[30] Foreign Application Priority Data

Jul. 1, 1985 [KR] Rep. of Korea ............... 85-8062[U]

[51] Int. Cl.$^4$ ............... A47J 45/07; A47J 45/08
[52] U.S. Cl. ............... 16/114 A; 16/DIG. 24
[58] Field of Search ............ 16/110 A, 114 A, 116 A, 16/DIG. 24; 220/94 R

[56] References Cited

U.S. PATENT DOCUMENTS

| | | | |
|---|---|---|---|
| 258,733 | 5/1882 | Ezard ............................ | 16/114 A |
| 1,403,232 | 1/1922 | Collard ............................ | 16/116 R |
| 2,133,252 | 10/1938 | Moore et al. ..................... | 16/110 A |
| 2,317,349 | 4/1943 | Wolfers ............................ | 16/114 A |
| 2,521,463 | 9/1950 | Kircher ............................ | 16/110 A |
| 3,774,263 | 11/1973 | Day et al. ......................... | 16/114 A |

FOREIGN PATENT DOCUMENTS 1077475  6/1967  United Kingdom ............ 16/114 A

*Primary Examiner*—Donald R. Schran
*Assistant Examiner*—James L. Wolfe
*Attorney, Agent, or Firm*—Birch, Stewart, Kolasch & Birch

[57] ABSTRACT

A handle assembly for a cooking container which comprises a handle member connected to the cooking container, the handle member including a hollow coupler adapted to contact the cooking container, a handle having hollow end portion and an insulated connecting member disposed intermediate to the hollow coupler and the handle, one side of the intermediate member being slidably disposed within the hollow coupler, and the other side thereof being slidably disposed within the hollow portion of the handle member and screw means extending through the insulated connecting member and through the hollow coupler for screw engagement with the cooking container.

5 Claims, 3 Drawing Sheets

4,794,666

HANDLE ASSEMBLY FOR A COOKING CONTAINER

This application is a continuation of application Ser. No. 770,199 filed on Aug. 28, 1985, now abandoned.

BACKGROUND OF THE INVENTION

The present invention relates to a handle assembly for a cooking container and more particularly, to an improved handle assembly comprising a metal handle member, a metal coupler and an insulated connecting member for insulating the metal handle member to the metal coupler and for preventing the hand of the user from touching the metal coupler.

There are many types of handle assemblies for a cooking container which are well known in the art which utilize a metal handle connected to the cooking container. However, these handle assemblies suffer from a number of disadvantages such as, for example, it is difficult to insulate the mtal handle to the metal coupler and to prevent the hand of the user from touching the metal coupler due to heat conduction. Furthermore, it is difficult to prevent the hand of the user from sliding from the metal handle. Also, an additional handle assembly connected to a lid of the handle assembly. Although there are handle assemblies which are made of plastic or wood, they are not made of a heat resisting hard material and do not have good athestic appearance.

OBJECTS AND SUMMARY OF THE INVENTION

Accordingly, it is an object of the present invention to provide an improved handle assembly for a cooking container.

Another object of the present invention is to provide a handle assembly which is structured with an insulated connecting member including a tongue portion configured to engage a slot disposed in a hollow metal handle member for tightly securing to the hollow metal handle member and for insulating the hollow metal handle to a hollow metal coupler. Also, the insulated connecting member includes a raised shoulder portion extending peripherally above the surface of the hollow metal coupler for preventing the hand of the user from touching the hollow metal coupler.

A further object of the present invention is to provide an additional handle assembly connected to the cooking container which has the same structural configuration as the handle assembly but has a smaller structure.

Still another object of the present invention is to proivde a handle assembly mounted to a lid of the cooking container which has the same structural configuration as the handle assembly but has a smaller structure.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to an improved handle assembly for a cooking container which comprises a hollow metal handle member containing a slot disposed in one end thereof, a hollow metal coupler, an insulated connecting member disposed between the hollow metal handle member and the insulated connected member, the insulated connected member including a tongue portion configured to engage the slot and a raised shoulder portion extending peripherally above the surface of the hollow metal handler for insulating the hollow metal handle member to the hollow metal coupler and for preventing the hand of the user from touching the hollow metal coupler, and screw means extending through the insulated connecting member and through the metal hollow coupler for screw engagement with the cooking container.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
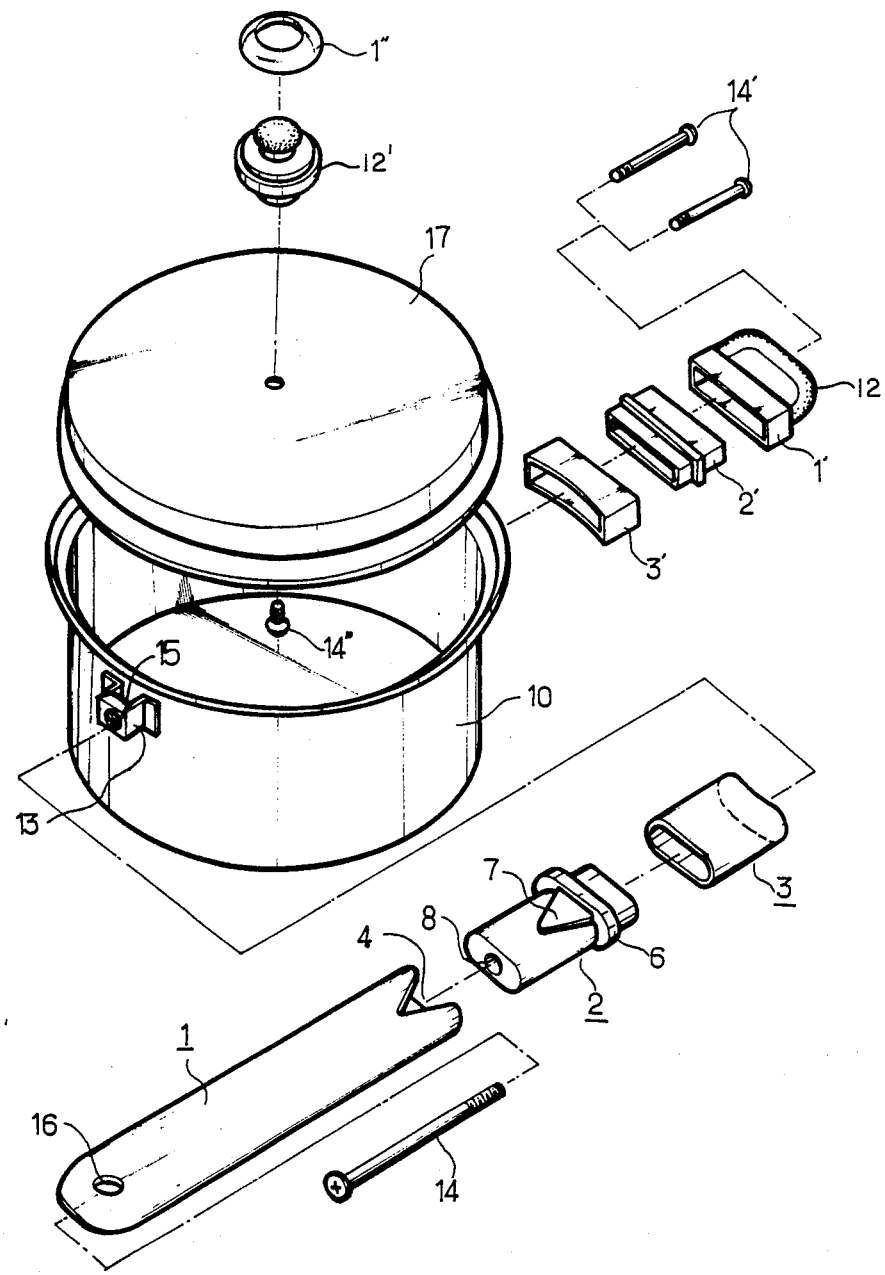
FIG. 1 is an exploded, perspective view of the handle assembly for a cooking container of the present invention.
Figure 2:
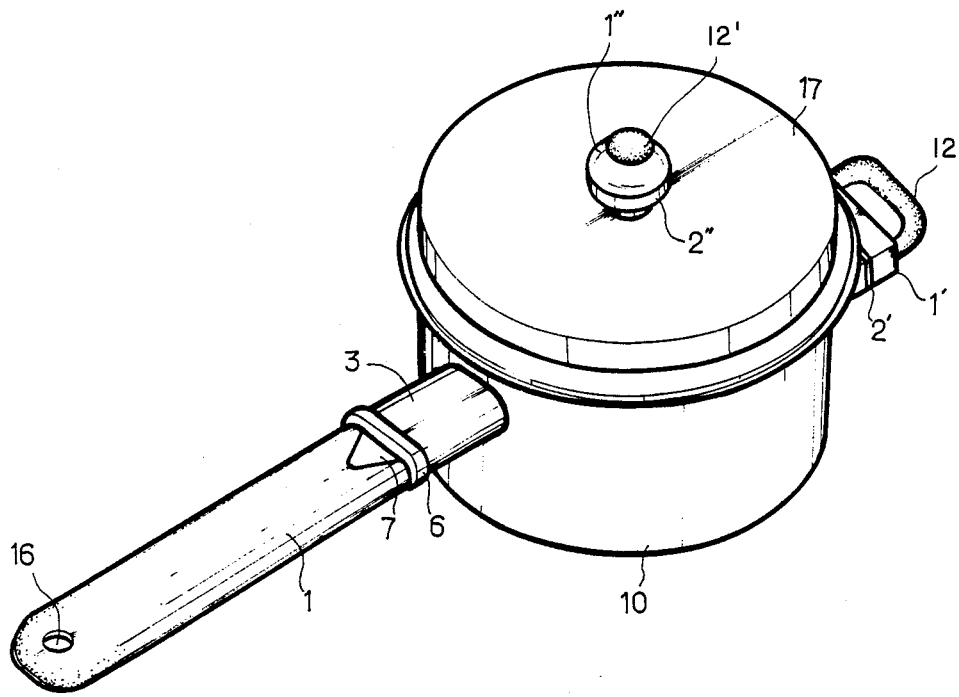
FIG. 2 is a perspective view of the handle assembly for a cooking container showing assembled device of the present invention.
Figure 3:
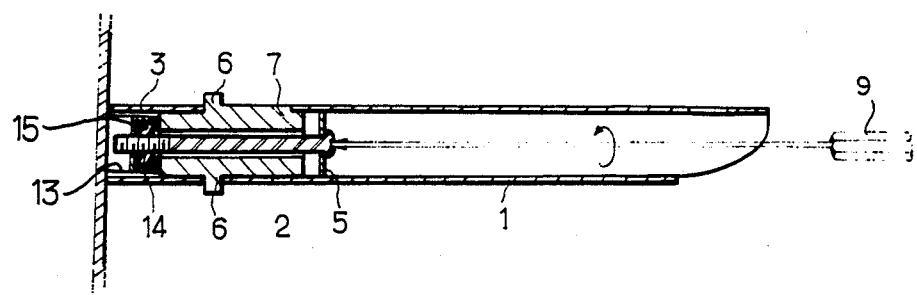
FIG. 3 is a cross-sectional view of the handle assembly of FIG. 3.

Referring now in detail to the drawings for the purpose of illustrating the present invention, the handle assembly for a cooking container 10 as shown in FIGS. 1 and 2 comprises a hollow metal handle member 1, a hollow metal coupler 3, an insulated connected member 2 disposed between the metal hollow handle member 1 and the hollow metal coupler 3, and screw means 14 extending through the insulated connected member 2 through an aperture 8 and through the metal hollow coupler 3 for screw engagement with a nut 15 of a gasket 15 secured to the cooking container 10 (FIG. 3).

The hollow metal handle member 1 contains a slot 4 disposed in one end thereof and a ring 16 which engages a hanger (not shown) for handging the cooking container 10. The insulated connecting member 2 includes a tongue portion 7 configured to engage the slot 4 disposed in one end of the hollow metal handle 1 and a raised shoulder portion 6 extending peripherally above the surface of the hollow metal handle member 1 for insulating the hollow handle member to the hollow metal coupler 3 and for preventing the hand of the use from touching the hollow metal coupler 3 (FIG. 3). Also, the insulated connected member 2 is slidably inserted at one end into the hollow metal handle member 1 and at the other end into the hollow metal coupler.

Figure 4:
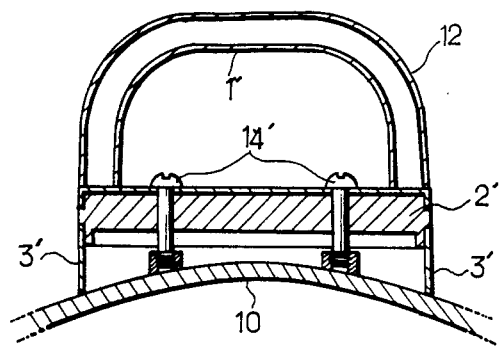
FIG. 4 is a cross-sectional view of the additional handle assembly of FIG. 3.

As shown in FIG. 4, the additional handle assembly mounted to the opposite side of the cooking container 10 to the first handle assembly of the present invention comprises a hollow metal handle member 1' having a gripping portion 12, a hollow metal coupler 3' and an insulated connecting member 2' disposed between the hollow metal handle member 1' and the hollow metal coupler 3'. The additional handle assembly has the same structural configuration as the first handle assembly of the present invention but has a smaller structure. Screw members 14' extends through the insulated connecting member 2' and through the metal hollow coupler 3' for screw engagement with the cooking container 10.

Figure 5:
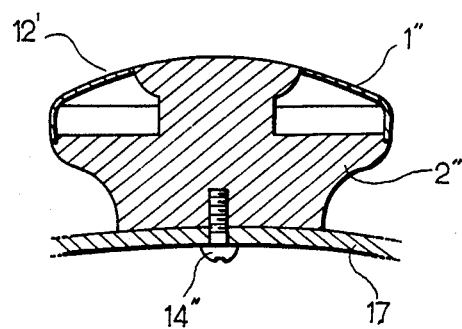
FIG. 5 is a cross-sectional view of the handle assembly mouned to a lid of the cooking container of FIG. 3.

As shown in FIG. 5, the handle assembly mounted to a lid 17 of the cooking container 10 comprises a tubular metal handle member 1" on insulated connecting member 2" extending the gripping portion 12' through the tubular metal handle member 1", and a screw member 14' extends through the insulated connecting member 2" for screw engagement with the lid of the cooking container 10.

The insulated connecting member 2, 2' and 2" are made of an insulating material having a heat resisting temperature of about 200° C., such as, for example, Bakelite.

In assembling, the screw means is screw engaged with the nut 15 of the gasket 13 secured to the cooking container 10 by a screw driver 9 in the direction indicated by arrow as shown in FIG. 3.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A handle assembly for a cooking container which comprises:

a hollow metal handle member containing a recessed portion disposed in one end thereof, a hollow metal coupler, an insulated connecting member disposed between said hollow metal handle member and said hollow metal coupler, said insulated connecting member including a corresponding projection configured to tightly engage said recessed portion for providing a thumb-engaging surface for the user and a raised shoulder portion, said insulated connecting member being slidably inserted at one end into said hollow metal handle and at the other end into said hollow metal coupler, said raised shoulder portion extending peripherally above the surface of the hollow metal handle member for insulating the hollow metal handle member to the hollow metal coupler and for preventing the hand of the user from touching the hollow metal coupler, and screw means extending through said insulated connecting member and through said hollow metal coupler for screw engagement with the cooking container.

2. The handle assembly of claim 1 wherein the handle assembly is attached to a cooking container.

3. The handle assembly of claim 2 wherein an additional handle assembly is provided on the cooking container, said additional handle assembly having the same structural configuration as the handle assembly but having a smaller structure.

4. The handle assembly of claim 3 wherein the cooking container is provided with a lid, said lid containing an insulated handle assembly mounted thereto.

5. The handle assembly of claim 2 wherein the insulated connecting member is made of Bakelite.

* * * * *